Dec. 12, 1967    V. M. MOGILEVSKY ET AL    3,358,224
FERROMETER FOR OSCILLOSCOPIC MEASUREMENT OF
MAGNETIC CHARACTERISTICS OF SAMPLES
OF MAGNETICALLY HARD MATERIALS
Filed Feb. 1, 1965    6 Sheets-Sheet 4

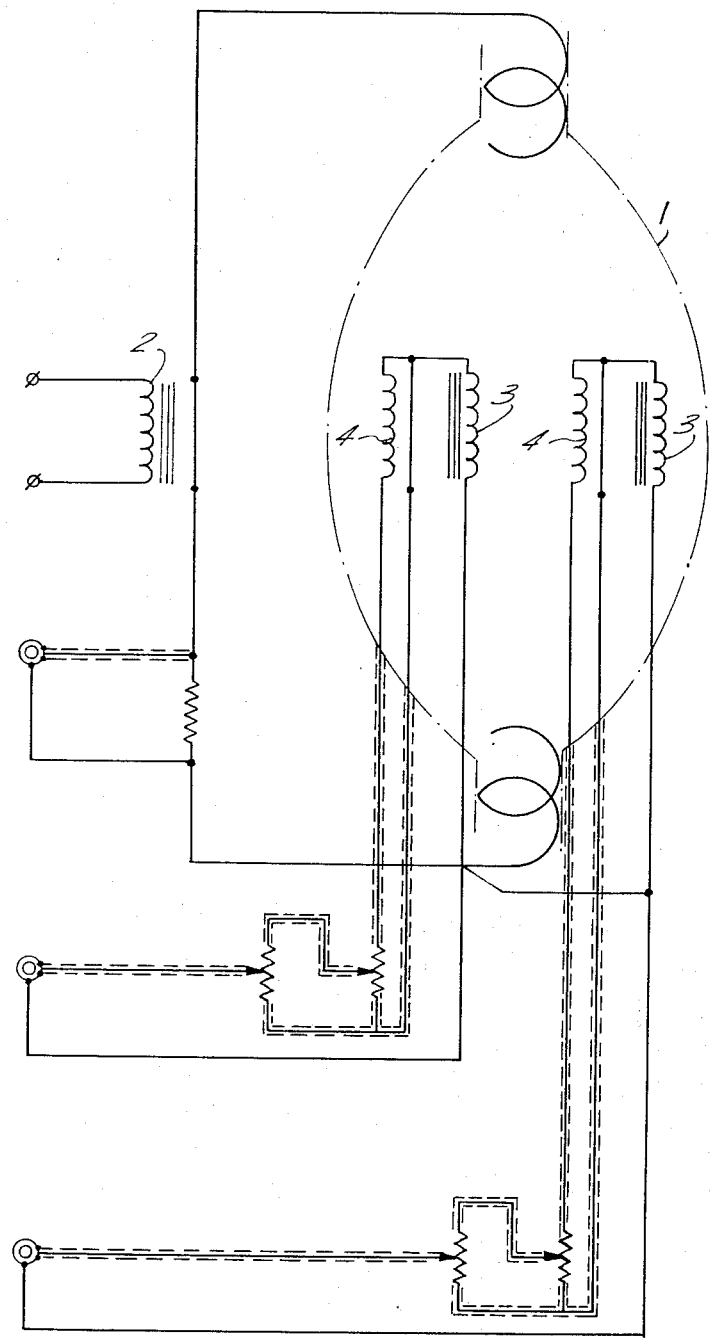
F I G. 3

FIG.6e
FIG.6f
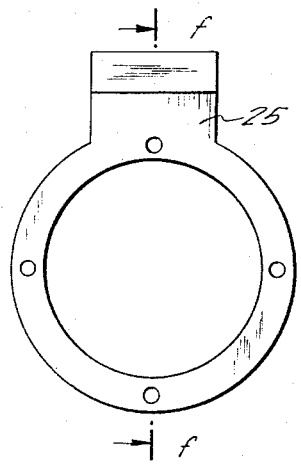
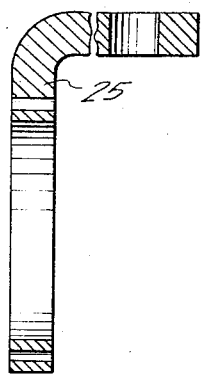
FIG.6g
FIG.6h
FIG.6j
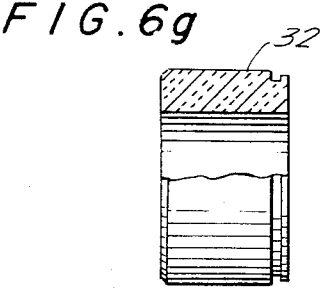
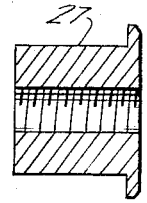
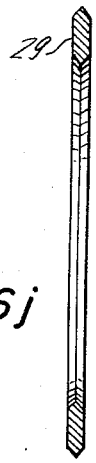
FIG.6k
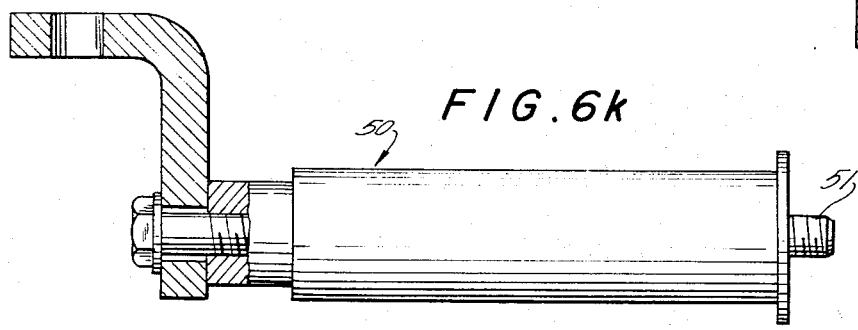

United States Patent Office 3,358,224
Patented Dec. 12, 1967

3,358,224
FERROMETER FOR OSCILLOSCOPIC MEASUREMENT OF MAGNETIC CHARACTERISTICS OF SAMPLES OF MAGNETICALLY HARD MATERIALS
Vitaly Moritsovich Mogilevsky, Mikhail Mikhailovich Savkin, and Pavel Petrovich Taljko-Grintsevich, Novosibirsk, U.S.S.R., assignors to Institute Gornogo Dela Sibirskoje otdelenie AN U.S.S.R., Novosibirsk, U.S.S.R.
Filed Feb. 1, 1965, Ser. No. 429,439
6 Claims. (Cl. 324—34)

The present invention relates to devices for oscillographic measurement of magnetic characteristics by obtaining an oscillographic image of the dynamic hysteresis loop of ferromagnetic magnetically-hard materials. Such devices are known as ferrographs, ferro-testers, and hysteresisoscopes.

The instruments of this type are particularly necessary when a high speed of measurements is required, even at the cost of accuracy, in checking mass products made of magnetic materials.

The error of the instruments of this type is the sum of the magnetization error caused by the non-uniformity of the magnetizing field, the error of the amplitude amplifiers, phase and frequency distortion of signals, reading error from the screen of the oscilloscope tube increasing in a direct proportion to the ratio between the ray diameter and the diameter of the screen, and the error of the mathematical treatment of the measurement results, since the known instruments do not provide the possibility of direct reading of magnetization and induction.

The previous solutions were aimed at the increase of speed and accuracy of measurements. The attempts to solve the problem were made in four basic directions:

(a) Development of a magnetizing device ensuring sufficient uniformity of a strong magnetizing field;

(b) Perfection of amplification means for the purpose of decreasing the distortions they introduce;

(c) Increase of the screen diameter of the oscilloscope tube for the purpose of decreasing the measurement error;

(d) Application of comparative measurements as to the identity of the hysteresis loop of the sample being measured and that of the standard sample by means of two-channel oscilloscopes, electronic or electromechanical switches.

The attempts to overcome said shortcomings did not prove successful, as they brought about the use of such magnetizing devices as cylindrical solenoids with a great relative length, which provided for sufficient uniformity of the field only in their central part, but made it difficult and sometimes impossible to carry out certain types of measurements.

An increase of the screen diameter of the oscilloscope tube requires either a considerable increase of its length or a rather complicated system for correcting distortions brought about by the spherical surface of the screen.

The application of comparative measurements as to the identity of the hysteresis loop considerably speeds up the process of checking the samples, but the effectiveness of the method is strongly decreased, since in addition to the checking it is also necessary to measure the absolute values of parameters of the sample under examination.

In conformity with the above, an object of the present invention is to broaden the applicability of the instrument by means of elimination of the errors caused by the nonuniformity of the magnetization field, and decreasing the size and weight of the instrument.

Another object of the invention is to provide a possibility of a direct measurement of induction and magnetization in the sample and, thus, to increase the speed of measurement and to eliminate possible errors during mathematical treatment of the results of measurements.

Among other objects of the invention is the development of a measuring resistor which allows measuring the value of the magnetizing field with high accuracy.

According to the objects of the present invention there is provided a ferrometer which includes the following:

a magnetizing device, creating a strong uniform magnetic field and having a small size and weight;

a computing device performing the operations of dividing the magnetization flux by the cross-section of the sample and calculating the value of induction by the magnetization in the sample and by the value of the magnetizing field;

A measuring non-reactive resistor allowing its connection into a high current circuit, of the order of kilo-amperes, which could be attested on direct current.

In order to solve said technical task, there is provided a ferrometer comprising:

Magnetizing means in the form of a single-layer solenoid wound as an ellipsoid and constituted of a material with high conductivity, connected into the secondary winding of the stepdown transformer and having a cooling fluid passing therethrough;

A divider and a summator, employing electronic amplifiers with negative feedback, introduced into the channels of J and H values for the purpose of making the signals in these channels of a common measuring system and carrying out the operations $$J = \frac{\phi_1}{S_o}$$

and $$B = H + 4\pi J$$

where:

J is the magnetization in the sample,
$S_c$ is the cross-section of the sample,
$\phi_1$ is the magnetization flux,
B is the induction in the sample,
H is the magnetizing filed intensity;

and with a non-reactive coaxial measuring resistor, connected directly into the circuit of the ellipsoidal solenoid of the magnetizing device.

The invention is described in greater detail hereafter with reference to the accompanying drawings wherein:

FIGS. 2 and 3 shows the construction of the magnetizing device and its electric circuit;

FIG. 6b is an end view of the housing in FIG. 6a;

FIGS. 6c and 6d are sectional views taken respectively along lines A—A and C—C in FIG. 6a;

FIG. 6e is an end view of a bus shown in FIG. 5;

FIG. 6f is a sectional view taken along lines f—f in FIG. 6e;

FIG. 6g is a side view partially broken away and in section of a ceramic bushing of FIG. 5;

FIG. 6h is a sectional view of a nut in FIG. 5;

FIG. 6j is a sectional view through a washer in FIG. 5;

FIG. 6k is a side view partly in section of a transformer secondary winding of FIG. 2;

Figure 1:
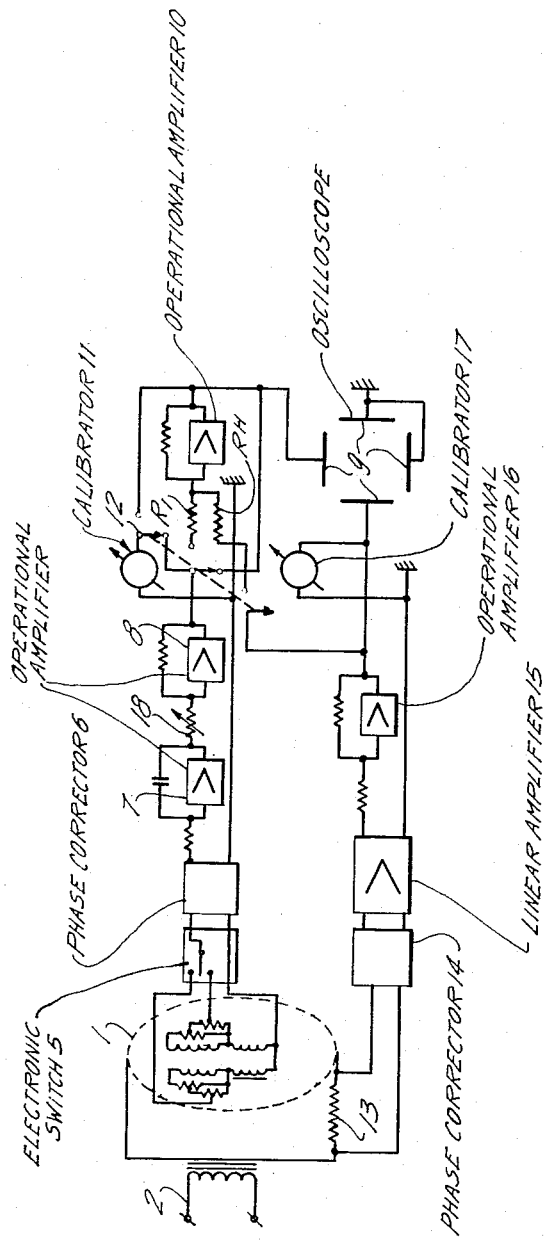
FIG. 1 shows the functional circuit of the ferrometer according to the invention.

FIGS. 7a–e are diagrammatic illustrations of oscillograms at various degrees of compensation of the field and phase.

Ellipsoidal solenoid 1 (FIG. 1) is connected into the seconary circuit of current transformer 2, which has one turn in the shape of ⊓-type bar.

The primary winding of transformer 2 is fed from a regulated source of alternating current with voltage stabilization.

In the central part of the inner cavity of the solenoid are two measuring coils 3 into which the standard sample and the sample to be measured are inserted.

In series-opposition with the measuring coils are connected compensation coils 4 with potentiometers for coarse and fine compensation. Measuring coils 3 are connected to the input of electronic (or electromechanical) switch 5, which provides the obtaining on the screen of the hysteresis loops of the standard sample and of the sample being measured.

The signal from electronic switch 5, proportional to the derivative of magnetization with respect to time in the sample, is applied to the input of phase corrector 6 and further follows through integrating amplifier 7, divider 8 either to the vertical plates of oscilloscope 9 or to resistor $R_J$ in the input circuit of summator 10, and from the output of summator 10 to the vertical plates of oscilloscope 9. The calibrator constituted by peak voltmeter II is connected by means of switch 12 either to the output of divider 8 or to the output of summator 10.

In the circuit of ellipsoidal solenoid 1 a non-reactive coaxial measuring resistor 13 is connected in series, which is a manganin disc (or washer) soldered into a tubular electrode. The current and potential electrodes of resistor 13 are connected into the circuit as shown in FIG. 1. The signal taken off the potential electrodes of resistor 13 is applied to phase corrector 14 and then follows through linear amplifier 15 and scale link 16 to the horizontal plates of oscilloscope 9.

With the help of switch 12, the output signal of divider 16 is applied to resistor $R_H$ in the input circuit of summator 10.

At the output of divider 16, a calibrator 17 is connected.

*Operating principle of the instrument*

The E.M.F., induced in the measuring coil into which the sample is placed is expressed by the following equation:

$$E_{mc} = -kW_{mc}\left[S_o\frac{dB}{dt} + (S_{mc} - S_o)\frac{dH}{dt}\right] \quad (1)$$

where:

$W_{mc}$ is the number of turns of measuring coil 3;
$k$ is the coefficient determined by the system of units;
$S_o$ is the cross-section of the sample;
$S_{mc}$ is the cross-section of a turn of the measuring coil 3;
$B$ is the induction in the sample;
$H$ is the magnetizing field.

When measuring magnetically-hard materials, the permeability of which is low, the second member in the brackets of expression (I) should not be neglected.

The influence of the air gap not filled by the sample on the accuracy of measurement is eliminated by series-opposite connection of a compensation coil, in which $$W_{mc}S_{mc} = W_{cc}S_{cc} \text{ or } W_{mc} = W_{cc} \text{ and } S_{mc} = S_{cc}$$

where $W_{cc}$ and $S_{cc}$ are the number of turns and cross-section of the compensation coil.

The E.M.F. of the measuring and compensation coils, connected in opposition-series, is expressed by the following equation:

$$E = -kW_{mc}\left[S_o\frac{dB}{dt} + (S_{mc} - S_o)\frac{dH}{dt} - S_{mc}\cdot\frac{dH}{dt}\right] =$$
$$= -kW_{mc}S_o\cdot\frac{d}{dt}(B - H) = -kW_{mc}S_o\frac{d}{dt}[4\pi J] \quad (2)$$

At the output of integrating amplifier 7 the value of the signal is expressed by the following equation:

$$U_J = K_J \cdot S_o \cdot 4\pi J \quad (3)$$

where:

$U_J$ is the signal at the output of the integrating channel;
$K_J$ is a constant coefficient, determined by the parameters of integrating channel J;
$S_o$ is the cross-section of the sample.

Similarly, at the output of linear amplifier 15 we have:

$$U_H = K_H \cdot H \quad (4)$$

where:

$K_H$ is the constant coefficient determined by channel parameters;
$H$ is the magnetizing field.

It is apparent that the magnetization in the sample, expressed in certain units, can be obtained if the output signal of integrating amplifier 7 is divided by the cross-section of the sample:

$$J = \frac{U_J}{S_o}$$

In the proposed instrument this operation is performed by divider 8, represented by an amplifier with great gain factor, embraced by negative feedback. It is known that the transmission coefficient of such amplifiers is expressed by the equation:

$$K_{tr} = \frac{R_\beta}{R}$$

where $R_\beta$ is the feedback resistance;
$R$ is the series resistance in the input circuit of the amplifier.

Resistance $R$ is a decade resistance box 18 connected into the input circuit and therefore the operation of dividing the output signal by the cross-section of the sample being tested can be carried out with necessary precision for any cross-section of the sample.

For this purpose it is necessary $$K_{tr} = \left|\frac{R_\beta}{R}\right| = \frac{J}{S_o}$$

where:

$S_o$ is the cross-section of the sample;
$K_{tr}$ is the transmission coefficient.

Induction in the sample can be found by the values of magnetization of the sample and of the magnetizing field from the expression:

$$B = H + 4\pi J$$

Introducing in this expression the values of the magnetizing field and magnetization, obtained from expressions (3) and (4), we obtain:

$$B = \frac{U_H}{K_H} + \frac{U_J}{S_o}\cdot\frac{1}{K_J} \quad (5)$$

This operation is performed by summator 10 and resistors $R_J$ and $R_H$ in the input circuit of which are fed the signals of link 8 of magnetizing channel J and divider 14 of channel H.

It is known that the output voltage of the summator of such type is for the general case expressed by the equation $$U_{out} = -R_\beta \sum_{m=1}^{m} \frac{U_{in\,m}}{R_m}$$

where $R_\beta$ is the feedback resistance;
$U_{in\,m}$ is the signal added;
$R_m$ is the series resistance at the input.

In the given case the output voltage of the summator is expressed by the equation:

$$U_{out} = -R_\beta \left( \frac{U_{J'}}{R_J} + \frac{U_{H'}}{R_H} \right)$$

where $$U_{J'} = \frac{U_J}{S}$$

$$U_{H'} = \frac{U_H}{K_H}$$

Selecting $R_H = R_\beta$ and $R_J = K_J \cdot R_\beta$, we obtain the voltage at the output of summator:

$$U_{out} = -\left( \frac{U_J}{S_o} \cdot \frac{1}{K_J} + \frac{U_H}{K_H} \right) \quad (6)$$

Comparing expressions (5) and (6), we see that $(U_{out}) = B$.

Thus, the calibrator-peak voltmeter 11 may be calibrated directly in the units of magnetization and induction.

The connection of the measuring resistor 13 in the circuit of the primary winding of transformer 2 is not desirable, since for obtaining a sufficient current measuring accuracy in the secondary circuit, the working point of transformer 2 should remain within the limits of the linear part of the basic magnetization curve. This would lead to a material increase of weight and overall dimensions of the magnetizing device.

The connection of the resistor directly into the circuit of the ellipsoidal solenoid is difficult because of the large current in it (kiloamperes). Besides, usual measuring resistors are not suitable for this circuit, as non-uniform distribution of the field current introduces errors, determined by the position of the connection points of the current and potential electrodes. These difficulties are eliminated by using a nonreactive coaxial measuring resistor. The resistor is made of manganin and, therefore, is thermostable.

Such a resistor is attested on direct current with high precision and maintains its value in the audio frequency range. The position of connecting points of the current and potential electrodes does not affect resistance value.

In frame 19 (FIG. 2) are located transformer 2, measuring resistor 13, compensation coils 4 and measuring coils 3. The compensation coils and measuring coils are wound on tubes 20 into which are inserted the standard sample and the sample under test. The tubes 20 are located in the inner cavity of ellipsoidal solenoid 1 and are oriented along its axis. For the purpose of obtaining greater current densities the solenoid is made of material having high conductivity and is cooled by an agent fed by means of branch pipes 21.

As the cooling agent, water, mineral oils, liquid gases can be used.

By making solenoid 1 in the shape of an ellipsoid uniformity of a considerable part of the magnetic field created in its inner cavity is obtained.

Figure 4:
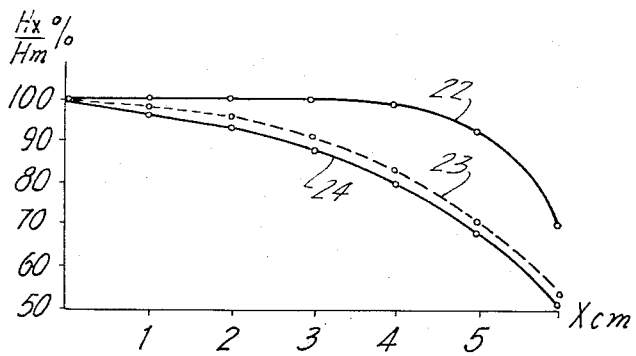
FIG. 4 shows the distribution of the field in the ellipsoid solenoid of the magnetizing device.

In FIG. 4 curve 22 represents the experimentally measured distribution of the magnetizing field along the major axis of the ellipsoidal solenoid with the length of the large axis being 120 mm. and the length of the minor axis being 60 mm. On the same coordinate grid curves 23–24 represent the distribution of the field in a cylindrical solenoid with the length and diameter being equal to the major and minor axes of the ellipsoidal solenoid respectively. Curve 23 has been computed, while curve 24 has been obtained experimentally.

As it can be seen in FIG. 4, the uniformity zone of the cylindrical solenoid measures 8.3 percent of the major axis length, while that of the ellipsoidal solenoid is about 67 percent.

The tested sample and the standard sample are inserted into tubes 20 with the help of a holder with clamps.

Transformer 2 is wound on a toroidal core for the purpose of reduction of the leakage. The electric circuit of the magnetizing device is given in FIG. 3.

Figure 2:
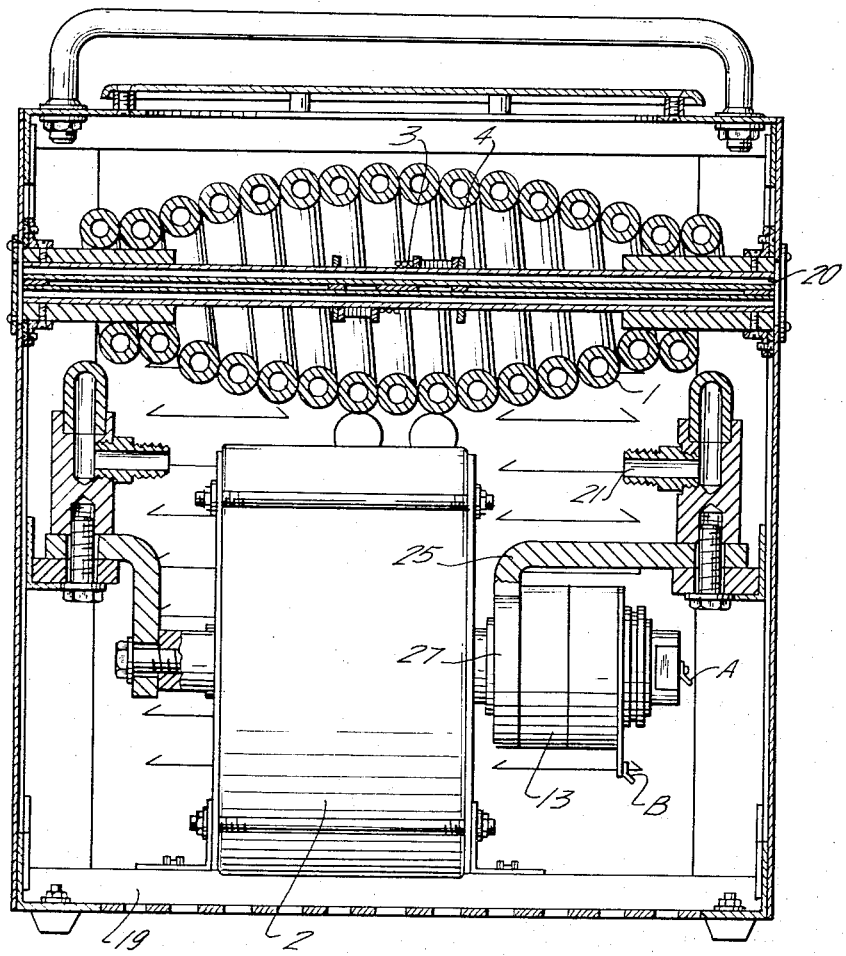
Figure 5:
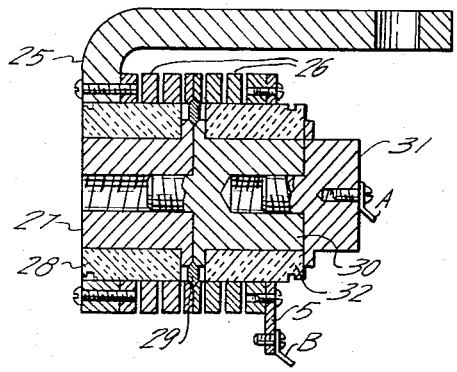
FIG. 5 shows in cross-section the construction of the measuring resistor.
Figure 6A:
FIG. 6a shows a portion of the housing of the measuring resistor in cross-section.
Figure 6B:
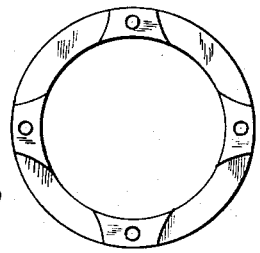
Figure 6C:
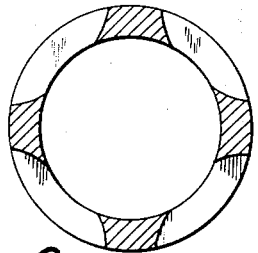
Figure 6D:
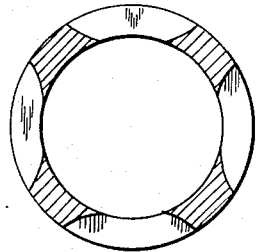

The construction of the measuring resistor is shown diagrammatically in FIG. 5. The assembly of the resistor is as follows:

A manganin washer 29 is installed between a nut 27 and a bushing 30, and the contacting surfaces of the washer, nut and bushing are secured by silver soldering or the like. Ceramic bushings 28 and 32 are then set on nut 27 and bushing 30 and covered with two housings 26. The contacting surfaces of washer 29 and of housing 26 are also secured by silver soldering or other suitable method. Silver soldering can be effected, for instance, by disposing a layer of silver solder between the surfaces of the washers and heating it in hydrogen flow, which clears the soldered surfaces of oxides. After the manganin washer has been installed, the measuring resistor is connected to the bus bar 25 and to the transformer secondary winding 50 (FIG. 6k) by threaded engagement of end 51 in the nut 27. The secondary winding and bus bar are in turn connected to the ellipsoidal solenoid by means of suitable fasteners as shown in FIG. 2.

The current electrodes of resistor are bus 25 and nut 27. The potential electrodes are contacts A and B.

To eliminate the effect of non-uniformity of distribution of the current field in housing 26, there are radial slits located in a stagged manner, due to which the length of the lines of force of the current field in the housing is practically the same at any location of the points of electrode connections.

The construction of housing 26 with slits through the grooves is shown in FIGS. 6a–6d.

The value of the measuring resistor is $10^{-5}$ ohms. The resistor is attested on direct current and maintains its value also over the range up to 1 kc. with an accuracy up to 0.001 percent.

A phase correction in channels J and H is necessary for non-distorted transmission of signals, which is provided on condition that $$T_{ph.1}(H) = T_{ph.1}(J) = 0$$

where $T_{ph.1}$ is the time of phase lag in channels J and H.

Used as phase correctors are RC chain correctors, ensuring the necessary phase shift over the required frequency range.

Resistive amplifiers are selected for the circuit of the measuring unit. These amplifiers have a pass band from 20 c.p.s. to 20 kc. and voltage amplification factors up to $10^5$ in units 7, 8, 10, 16 (FIG. 1). In linear amplifier is $15K = 10^3$ (FIG. 1).

The peak voltmeters-calibrators are connected through buffer stages, which are cathode followers.

The feedback resistors in the dividers and summator, and also the decade resistance box are made up of precision non-reactive wire-wound resistors.

*The method of operation of the instrument*

After the instrument has been switched on, field compensation of the measuring coil is checked. The measure of compensation is the horizontal location of axis X on the screen. The compensation is checked in the absence of the sample in the measuring coil.

Figure 7A:
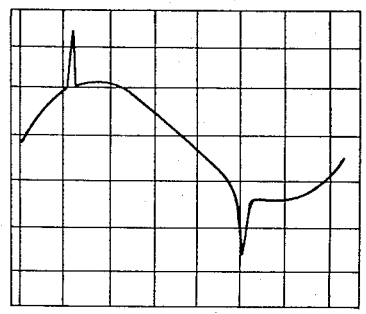
Figure 7B:
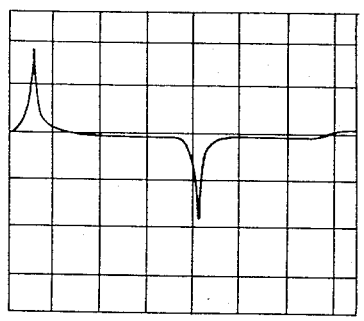

In FIG. 7a is shown the distortion oscillogram when the measuring coil is not compensated and in FIG. 7b when it is fully compensated. The exact compensation is effected with potentiometers from the front panel of the magnetizing device.

Phase compensation is effected by changing the value R of the phase correction RC chain.

Figure 7C:
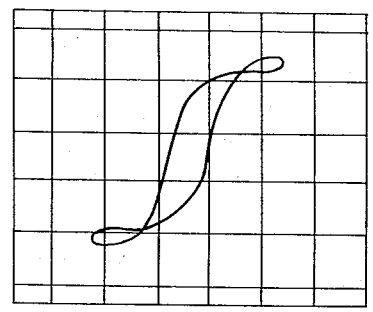
Figure 7D:
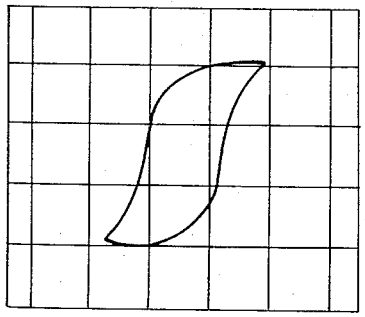
Figure 7E:
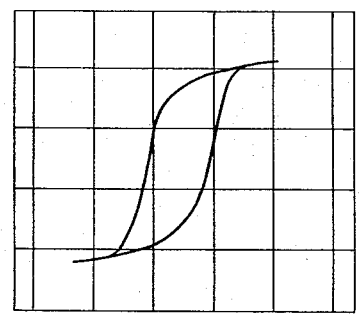

In FIGS. 7c, d, e are represented the oscillograms of the hysteresis loop. In FIGS. 7c, d are shown how the loop looks in case of phase distortions, and FIG. 7e shows how it looks in the case of full compensation. The accuracy of such method of phase compensation is $\pm 1°$. Phase correction is effected on the major hysteresis loop.

The calibration of the calibrator in channel J is effected with the help of the standard sample. The standard sample is a strip of perminvar 20 microns thick in which the saturation flux $\phi S_0$ has been measured by ballistic method. The hysteresis loop of perminvar has a rectangular shape.

The calibrator in channels J and H are calibrated in the amplitude values B, J, and H.

What is claimed is:

1. A ferrometer for oscilloscopic measurements of magnetic characteristics of samples of magnetically hard materials comprising: a current transformer having a primary winding energized with alternating current, and a secondary winding in which is connected a solenoid in the form of a rotation ellipsoid and constituted by a material possessing relatively high electric conductivity and inducing intensive uniform alternating magnetic field; measuring coils disposed in said alternating field, the test sample being adapted for being inserted into one of said coils, and the standard sample into the other one for inducing in each coil, signals proportional to the derivative of the induction with respect to time in the corresponding sample; compensation coils in said alternating solenoid field and having opposite series connection with each of said measuring coils and responsive to the intensity of said field; a magnetization channel at the output of said measuring and compensation coils, said channel comprising a series connection of means for alternate removal of the first signal from said measuring and compensation coils cooperating with the standard sample, and the second signal of the measuring and compensation coils cooperating with the test sample; a phase corrector for adjusting the phase shift of said first and second signals; an integrating amplifier receiving said first and second signals after phase correction thereof; means for dividing said first and second integrated signals, proportional to the magnetization flux in the samples, by a constant magnitude proportional to the area of the sample cross-sections; an oscilloscope having vertical plates supplied with said divided signals indicative of the magnetization acquired by the test sample; an indicator of the amplitude of said signals indicative of the magnetization in the test sample and connected in parallel to the vertical plates of said oscilloscope; a non-reactive measuring resistor connected in series with said solenoid for obtaining a third signal proportional to the intensity of the magnetic field within the solenoid; a field intensity channel connected to said measuring resistor and comprising a series connection of a phase corrector for adjusting the phase shift of said third signal; a linear amplifier of the signal across the phase corrector output; means for regulating the value of said third signal to a common measuring system with said first and second signals, the latter said means being connected to the horizontal plates of said oscilloscope; an indicator of the amplitude of said third signal connected in parallel to the horizontal plates of the oscilloscope; means for algebraically adding said first or second signal to the third signal for obtaining a resultant signal indicative of the induction present in the respective sample, the output of said means being connected to the vertical plates of said oscilloscope; and a switch for selectively connecting said sample magnetization and field intensity channels to the inputs of said adding means or directly to the oscilloscope plates.

2. A ferrometer according to claim 1, wherein said solenoid is constituted by a metallic tube wound in a single row in the form of a rotation ellipsoid and adapted for the passage of cooling liquid therethrough.

3. A ferrometer according to claim 1, wherein said non-reactive measuring resistor is a manganin washer enclosed in a housing and centered therein by means of ceramic bushings.

4. A ferrometer according to claim 3, wherein said housing has radial slots arranged in a checkered pattern.

5. A ferrometer according to claim 1, wherein the indicators of the signal amplitude are peak voltmeters calibrated in units of induction in said magnetization channel and in units of field intensity in said field intensity channel.

6. A ferrometer according to claim 1, wherein said means for dividing said first and second signals, said means for bringing the third signal to the given scale and said means for adding the signals are operational amplifiers.

References Cited

UNITED STATES PATENTS

| | | | |
|---|---|---|---|
| 2,946,948 | 7/1960 | Foner | 324—34 |
| 2,965,841 | 12/1960 | Small | 324—34 |
| 3,040,246 | 6/1962 | Lundin | 324—40 |

OTHER REFERENCES

Lord, H. W.: Dynamic Hysteresis Loop Measuring Equipment, Electrical Engineering, June 1952, pp. 518–521.

Scherb, M. V.: Cathode-Ray Magnetization Curve-tracer, The Review of Scientific Instruments, vol. 19, #7, pp. 411–419, July 1948.

RUDOLPH V. ROLINEC, *Primary Examiner.*

RICHARD B. WILKINSON, WALTER L. CARLSON, *Examiners.*

R. J. CORCORAN, *Assistant Examiner.*